United States Patent [19]

Walters et al.

[11] Patent Number: 4,701,307
[45] Date of Patent: Oct. 20, 1987

[54] VENTED RISER

[75] Inventors: Paul W. Walters, Ashland; Roger M. Benslay, Catlettsburg, both of Ky.

[73] Assignee: Ashland Oil, Inc., Ashland, Ky.

[21] Appl. No.: 860,264

[22] Filed: May 6, 1986

Related U.S. Application Data

[63] Continuation-in-part of Ser. No. 652,351, Sep. 19, 1984, abandoned.

[51] Int. Cl.[4] .................................................. B01J 8/18
[52] U.S. Cl. .................................... 422/147; 208/161; 422/144; 422/145; 55/318; 55/441; 55/DIG. 14
[58] Field of Search ................ 208/161; 422/144, 145, 422/147; 55/318, 441, DIG. 14

[56] References Cited

U.S. PATENT DOCUMENTS

| 3,826,738 | 7/1974 | Zenz | 422/211 |
| 4,390,503 | 6/1983 | Walters et al. | 422/147 |
| 4,394,349 | 7/1983 | Cartwell | 422/144 |

Primary Examiner—Barry S. Richman
Assistant Examiner—William R. Johnson
Attorney, Agent, or Firm—Richard C. Willson, Jr.; Stanley M. Welsh

[57] ABSTRACT

An improved ballistic separation device results from surrounding the downstream end of a progressive flow reactor or riser reactor with a concentric conduit that is in fluid communication with a cyclone separator and optionally in fluid communication with dipleg take-offs. The device may also include a bevelled lip or projection at the axial opening of the progressive flow reactor.

23 Claims, 16 Drawing Figures

FIG. 15
OPEN CUP VENTED RISER AND MODIFICATIONS
EFFICIENCY MEASUREMENTS VERSUS VELOCITY

① STD OPEN CUP WITH BOTTOM REMOVED  L/D = 0.3
② STD OPEN CUP VENTED RISER WITH BOTTOM OF CUP CLOSED  L/D = 0.3
③ CONCENTRIC PIPE VENTED RISER  L/D = 9.0
④ CONCENTRIC PIPE VENTED RISER  L/D = 17.0

VENTED RISER

This application is a continuation-in-part of application Ser. No. 652,351, filed Sept. 19, 1984, now abandoned.

CROSS REFERENCE TO RELATED CASES

The following related cases may contain information or make reference to prior act that is material to the instant application:
Ser. No. 744,998 (U.S. Pat. No. 4,066,533); Ser. No. 800,780 (U.S. Pat. No. 4,070,159); Ser. No. 361,661 (U.S. Pat. No. 4,424,116); Ser. No. 533,371; Ser. No. 263,394 (U.S. Pat. No. 4,390,503); Ser. No. 438,074 (U.S. Pat. No. 4,495,063); Ser. No. 521,504; Ser. No. 378,578 (U.S. Pat. No. 4,477,335).

BACKGROUND OF THE INVENTION

This invention relates to an apparatus for separating solid particulates from a gaseous effluent. More specifically, the invention is concerned with efficient separation of very small fluidized catalytic or non-catalytic particles from a gaseous effluent comprising said particles and treated carbo-metallic hydrocarbons.

In the contacting of hydrocarbons, extensive use is made of circulating fluidized beds. The apparatus employed for such systems as fluid catalytic cracking of hydrocarbon oils comprises a contacting zone, a disengaging zone, a regeneration zone and means to circulate solids, and vapors. The apparatus of this invention centers on the disengaging zone in which fluid contacting material is rapidly separated from a gaseous or vaporous effluent.

A very effective contacting zone for hydrocarbon conversion is an elongated conduit such as found in a riser cracking zone. The riser cracker zone features rapid intimate contact of fluidized catalyst particles with hot oil vapors as the material progressively moves within the zone. The vaporous effluent components are quickly and substantially separated from the catalyst particles near the downstream exit of the zone. A discussion of prior art methods and apparatus used to carry out this separation of solid particulates from vapors is given in the section entitled PRIOR ART, which follows immediately hereinafter.

PRIOR ART

U.S. Pat. No. 4,070,159 (1978) and U.S. Pat. No. 4,066,533 (1978) both assigned to Ashland Oil, Inc. and represented in part in FIG. 2 disclose an apparatus and method for the removal of solid disperoids from gases wherein a separation means such as a cyclone is in direct communication at an upstream location with an open vented riser.

U.S. Pat. No. 4,219,407 (1980) assigned to Mobil Oil Corporation discloses as a riser cracking operation wherein an improved method for separating vapors from entrained catalyst solids is employed. A mixture of vapors and particulates which have been induced to exit from a riser reactor zone are induced to flow outwardly then downwardly. The curved flow path imposed upon the effluent from the riser gives rise to a moment that concentrates the particulates in the mixture of vapors and particulates along a surface which imposed the the curved path downstream of the riser. The process is very similar to that disclosed in U.S. Pat. No. 4,313,910 discussed hereinafter.

U.S. Pat. No. 4,295,961 (1981) and U.S. Pat. No. 4,364,905 (a division of '961) assigned to Standard Oil Company (Indiana) and represented in part in FIGS. 4 and 5 disclose apparatus and methods for fluid catalytic cracking which utilizes the same flow reversing means of separation as discussed in U.S. Pat. No. 4,310,489.

U.S. Pat. No. 4,310,489 (1982) assigned to Standard Oil Company (Indiana) discloses an apparatus for catalytic cracking of hydrocarbons. The apparatus uses an enclosed vented riser to carry out a primary separation wherein the direction of a mixture of vapors and particulates are caused to reverse direction. Cracked hydrocarbons are withdrawn laterally from the downwardly flowing mixture. The separation process disclosed involves reversing the direction of flow of a mixture of hydrocarbons and particulates, preferably to a downstream direction by conducting the mixture through a flow reversing zone. conducting the mixture through a flow reversing zone.

U.S. Pat. No. 4,313,910 (1982) assigned to Shell Oil Company discloses an apparatus for separating gas from a particulate stream. A mixture of particulates and gas exit from an open conduit such as a riser and are diverted by a wall surface such as a deflecting surface which causes the mixture particles and gas to travel in a curved path which leads to a concentration of accelerated particles along the wall surface which induces the curved path. In the preferred embodiment, the curved path directs the particles in a downward direction into a disengaging chamber. The vapors substantially separated from the downward directed particles are then picked up indirectly with cyclones or other separation means within the disengaging chamber from a dilute phase above the dense phase of particulates which have collected at the bottom of the disengaging vessel. There is no ballistic separation in the sense intended by this specification, wherein the vapors are induced to move laterally with respect to the direction of flow of a mixture of particulates and vapors.

U.S. Pat. No. 4,318,800 (1982) assigned to Stone and Webster Engineering Corporation discloses an improved thermal regenerative cracking apparatus and process. Separator efficiency was improved by causing vapor components to move in a flow path involving a 180° turn. Further it was disclosed that the flow path must be essentially rectangular and the relationship between barrier height and the sharpness of the U-bend in the gas flow was very significant.

U.S. Pat. No. 4,394,349 (1983) assigned to Standard Oil Company (Indiana) discloses an apparatus for fluidized catalytic cracking of a hydrocarbon feedstock. The apparatus involves a riser reactor and a collar positioned about the axis defined by the downstream end of the reactor. The collar is positioned in close proximity to, but not in contact with, the riser reactor so that an annular space is defined between the riser reactor and the collar. The collar has a diameter greater than the diameter of the riser, but is spaced away from the riser so as not to be in contact with the riser in order to avoid expansion problems. The significant difference between the riser disclosed in '349 and the instant invention is the fact that the "collar" of the instant invention surrounds the riser progressive flow conduit without directly interacting with effluent after it has emerged from the open end of the riser. This point is discussed in more detail hereinafter.

U.S. Pat. No. 4,390,503 (1983) assigned to Ashland Oil, Inc. and represented in part in FIG. 3 discloses a vented riser having as described throughout this specification an open cup with closed base which surrounds a riser conduit. In fluid communication with this open cup with closed base is a conduit which is adapted for connection to a second separation means such as a cyclone.

There are several patents which have used prior art embodiments of vented risers assigned to Ashland Oil, Inc. These U.S. Pat. Nos. are: 4,066,533; 4,070,159; 4,390,503; 4,424,116 and 4,435,279.

While an open ended riser tube has many demonstrated advantages, efficiency is reduced by the tendency for a portion of the separated solids in the disengaging zone to be reentrained and carried back into the open end of a riser or progressive flow reactor.

Accordingly, it is an object of this invention to avoid or lessen the tendency for reentrained solid particulates to enter a riser or conduit leading to a cyclone separator means used in conjunction with the riser or progressive flow reactor.

SUMMARY OF THE INVENTION

Broadly, this invention involves a means for separating particles from vapors. Mixtures of vapors and particles can arise from a variety of processes. For example, the instant invention has been found to be especially useful in separating cracking catalysts from hydrocarbon product vapors such as arise in the catalytic cracking of carbo-metallic oils, discussed in more detail in this specification.

Other processes which the improved ballistic separation of the instant invention can be used are: separation of fluid-bed reforming catalyst particles containing precious metal or non-precious metal oxides; separation of ash from gaseous products in coal liquefaction and gasification; separation of coke fines from vaporous products in Flexicoking processes such as licensed by Exxon Research and Engineering Company; separation of fluid bed catalysts from vaporous products which arise during the preparation of acrylonitriles in processes such as developed by Sohio; separation of fluidized bed catalysts from reaction products of oxidation, alkylation, or ammidoxidation; separation of sawdust from air arising during wood pulp processing; and separation of fluid catalytic cracking catalysts from hydrocarbon products such as in the processes licensed by Research and Development Company, UOP, Inc. or M. W. Kellogg Company.

In the embodiment, there is a disengaging chamber, a transport means such as a progressive flow reactor having a downstream end which is totally within the disengaging chamber, and a conduit chamber surrounding at least a portion of said downstream end of the transport means. Of critical importance to the proper functioning of the invention is that the mixture of particulates and vapors exiting from the axial opening in the downstream end of the transport means do not directly impinge on or interact with the conduit chamber to any substantial degree. This fact provides the basis for asserting that there is a significant departure from the invention disclosed in U.S. Pat. No. 4,394,349 ("'349") (1983).

In '349, the downstream conduit that corresponds to the conduit chamber surrounding the instant invention, unlike the instant invention, directly and substantially impacts and controls the flow pattern of the mixture of vapors and particulates after they have exited from the riser or progressive flow reactor. (See FIG. 14 and the discussion corresponding thereto.)

Still, another embodiment of this invention involves the fact that the walls of the conduit chamber surrounding at least a portion of the downstream end of the progressive flow reactor is in certain circumstances, preferably planar, e.g. a conduit having a rectangular or square shape in cross-section. (See discussion of FIG. 8.)

Still a third embodiment of this invention involves using a dipleg takeoff which is in fluid communication with a downstream exit from the conduit chamber.

Still one additional variation of the instant invention involves having a lip projection surrounding the downstream axial opening of the progressive flow reactor conduit. An example of such a projection is discussed with respect to FIG. 10. However, the use of such projections on any of the other embodiments disclosed in FIGS. 6, 7, 8, and 9 is an obvious variation in light of the hereinafter discussion with respect to FIG. 10 and is intended to be part of the instant invention. Such a projection is preferably used with a vertical axial opening as opposed to a downwardly directed axial opening.

Figures 1, 13:
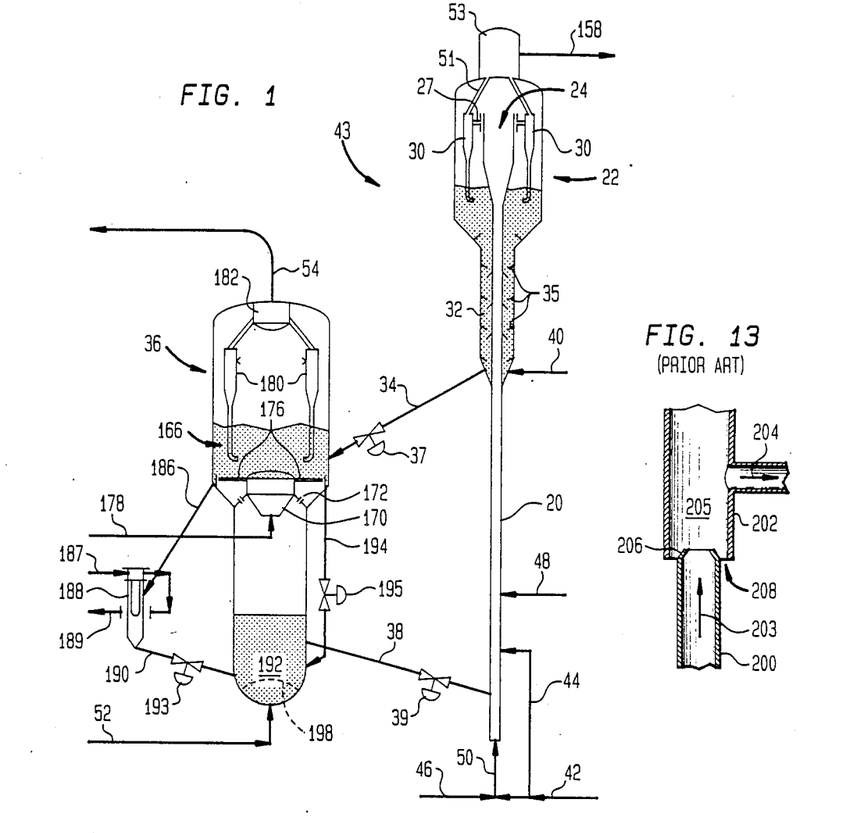
FIG. 1 discloses a partially schematic view in side elevation view of an example of how a vented riser of this invention can be used.
FIG. 13 discloses a prior art embodiment for a vented riser in U.S. Pat. No. 4,394,349 (1983).

In FIG. 1, there is disclosed a hydrocarbon conversion reactor 43 and regenerator 36. The reactor comprises a riser 20, a disengaging chamber 22, cyclones 30, a stripper zone 32 and conduits 34 and 38 which interconnect riser reactor 20 and regenerator 36. Regenerator 36 takes in regenerator gas, e.g. oxygen-containing gas, through conduit 52 passes it through carbonaceous coated catalysts and removes flue gasses through conduit 54 for later processing.

Briefly, the riser reactor 20 and regenerator 36 of FIG. 1 operate as follows. Optionally, steam may be introduced through conduit 46 and mixed with either a hydrocarbon feed or lift gas from conduit 42 and introduced through conduit 50 into riser 20. Regenerated catalyst is introduced through conduit 38 into a lower portion of riser 20 for mixture with incoming gasses entering through conduit 50. A mixture of catalyst with gas from conduit 50 are accelerated up riser 20 and brought into contact with feeds entering conduits 42, and 44, and/or 48. Multiple feed injection ports are available in the riser so as to control contact time. More than one type of feed may be introduced through the different feed injection points. Catalysts and vapors move up conduit 20 providing a contact time of no more than about 3 to 5 seconds. Catalyst and vapor exit through the downstream end 24 of riser 20 into disengaging chamber 22.

Figure 6:
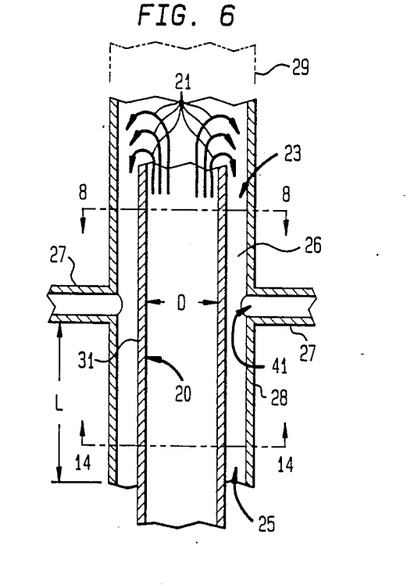
FIG. 6 discloses an example of the instant invention.

Since the catalyst solid particles have a greater inertia than the vapor components, there is a greater tendency for the catalyst particles to continue in a straight line as they exit from riser 20. However, the vapor components can be induced more easily to move in a transverse direction to the direction established by the axial opening of riser 20. Referring to FIG. 6, the vapors are induced to move into conduit chamber 26 defined by conduit wall 28 on one side and the exterior surface 31 of conduit 20. The vapors having entered chamber 26 are removed therefrom through conduits 27 and then into cyclones 30 shown in FIG. 1.

The mixture of solids and vapors which enter into cyclone 30 are further separated into particulates and vapors in ways which are conventionally known and understood in the cyclone art. The vapors exit from cyclones 30 through conduits 51 and then into plenum chamber 53. The particulates, meanwhile, exit through diplegs 154 into a dense phase bed in stripper zone 32.

Within stripper zone 32, there are stripper vanes 35 that permit a certain amount of agitation and movement of catalyst particles as they are brough into contact with steam which enters through conduit 40.

The steam stripped carbonaceous coated catalyst is removed from stripper zone 32 through conduit 34 within which there is a flow control valve 37 and then into regenerator 36. The carbonaceous coated particles are then regenerated by contact with an oxygen-containing gas which burns off substantially all of the carbonaceous deposits from the particles. Regenerated particles are removed from regenerator 36 through conduit 38 within which there is a flow control valve 39 for return to riser 20 where the process is repeated.

In FIG. 1, there is a two stage regenerator disclosed. Initially, stripped catalysts, e.g. by steam, from hydrocarbon conversion reactor 43 is transported through conduit 34 passed flow control valve 37 into upper regeneration zone 166. Oxygen containing gas, e.g. air with or without steam, enter through conduit 178 to a plenum chamber 170. Alternatively, the oxygen containing gas can enter directly into the dilute phase above the dense phase bed 192 and then through passage ways 172 in to upper zone 166. Oxygen containing gas that enters through plenum chamber 170 is distributed into upper zone 166 through conduits 176 for maximum dispersion of oxygen containing gas throughout the bed in upper zone 166.

Flue gases above the dense phase bed in upper zone 166 enter cyclone 180 wherein entrained particles are separated from the flue gas. Particulate components separated in cyclone 180 are returned to dense phase bed in the upper regenerator and vapor components of flue gas are transported to plenum 182. Flue gases are then removed from plenum 182 by means of conduit 54 upon which additional processing may be carried out in a down stream operation.

A portion of the partially regenerated catalyst from upper dense phase bed 166 is transported through conduit 186 through a cooler 188 then through conduit 190 having a flow control valve 193 into dense phase bed 192. A second portion of partially regenerated catalysts from upper dense phase bed 166 is transported thru conduit 194 past flow control valve 195 into dense phase bed 192. Passage of partially regenerated catalysts directly from the upper zone of dense phase bed 166 to the lower zone dense phase bed 192 thru conduit 194 is done in order to permit temperature control of the lower zone in conjunction with flow of catalysts thru catalyst cooler 188. Additional oxygen containing gas enters through conduit 52 into a distribution point then through a grid 198 for uniform distribution through dense phase bed 192. Flue gases from lower zone exit through pathway 172 then into the upper dense phase bed 166. After additional oxidation and carbonaceous deposit removal, vapors exit regenerator 36 through conduit 54.

Examples of carbo-metallic oils or hydrocarbon feedstocks that may enter riser 20 through conduits 42, 44 and 48 are ones containing 650+ boiling materials, plus metals such as copper, nickel, vanadium, and the like. Vacuum gas oil, recycle light cycle oil or vacuum resides are common examples of such oils. Steam at a pressure and temperature of about 50–450 pounds per square inch ("psi") and about 250°–450° F., respectively, can be introduced through conduits 40 and 46.

Examples of the particles or catalysts that are conventionally used in a riser reactor such as disclosed in FIG. 1 are process clays which may contain a zeolite. In catalytic cracking the particle size of the catalyst are preferably in the range of about 40 to about 120 microns. Of course, the larger the catalyst particles, the more efficient is the separation achieved in a ballistic type process exemplified in the instant invention. Regenerator 36 is usually at a temperature in the range of about 1200°–1600° F.

Figure 2:
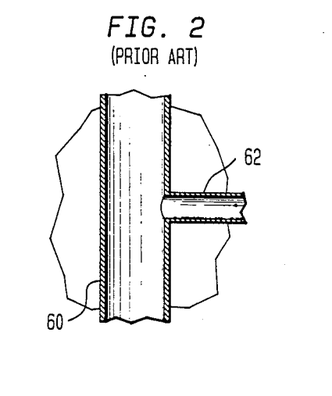
FIGS. 2-5 disclose four examples of the PRIOR ART.
Figure 3:
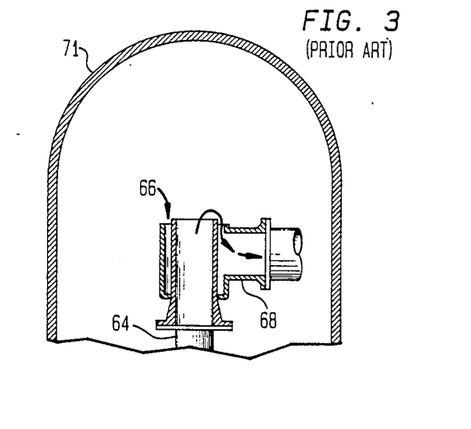

FIGS. 2, 3, 4, 5 and 13 represent examples of the PRIOR ART. FIG. 2 shows the downstream end of riser 60 with a takeoff conduit 62. This arrangement for the downstream end of a riser is disclosed in U.S. Pat. Nos. 4,066,533 and 4,070,159. FIG. 3 is an improvement over the riser shown in FIG. 2 and is disclosed in U.S. Pat. No. 4,390,503. This is the downstream end of a conduit 64 axially venting into a disengaging vessel 71. A cup-like chamber 66 surrounds the downstream end of conduit 64. From cup-like chamber 66 there is a conduit 68 which leads to a cyclone or other separation means (not shown).

Figure 4:
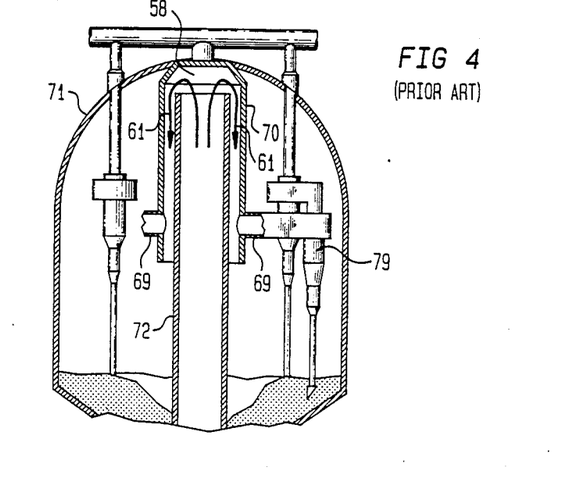
Figure 5:
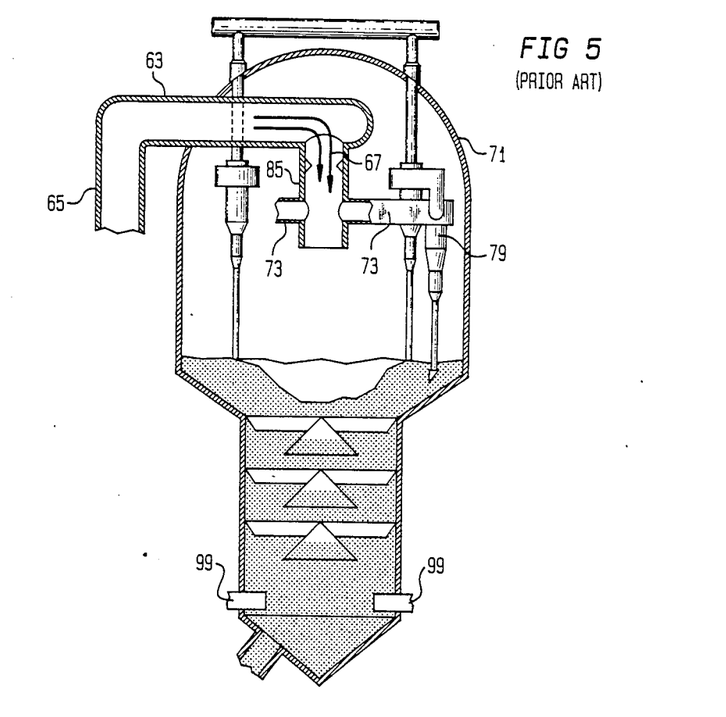

FIGS. 4 and 5 are disclosed in U.S. Pat. No. 4,295,961. Within separation or disengaging chamber 71 of FIG. 4, there is a riser 72 with a downstream end of which is surrounded by a cap 70. Cap 70 defines a flow reversal zone 58. A mixture of catalyst and vapors exiting vented riser 72 enter flow reversal zone 58 and are induced to reverse direction of flow into a downly directed mixture of vapors and particulates. From the downwardly directed flow indicated by arrows 61, the vapor components having lower inertia are induced to exit through conduits 69 to a separator means 79. In FIGURE 5, in place of cap 70, at the end of a riser 72, there is a flow reversal conduit 63 at the end of a riser 65. The purpose of flow reversal conduit 63 is to induce a downwardly directed flow (indicated by arrows 67) of a mixture of vapors and particulates that have risen through conduit 65. The vapor components of the downwardly directed mixture of vapors and particulates because of lower inertia are induced preferentially to move through conduits 73 into separation means or cyclones 79.

FIG. 6 shows in more detail, an enlarged vented riser of the instant invention disclosed in FIG. 1. Surrounding riser 20 is a conduit 28. Through a wall of conduit 28 are conduits 27 which lead to a cyclone separator means 30 (not shown). Chamber 26 or conduit chamber 26 is defined by the exterior surface of riser 20 and the interior surface of conduit 28. Phantom wall 29 indicates that the relative height of riser 20 as compared to conduit 28 may vary. In operation, as a mixture of vapor and entrained particulates exits from riser 20 part of the mixture consisting substantially of vapor components only is induced to move in a curved path indicated by arrows 21 into entrance 23 and then out through conduits 27 to cyclone separator means 30 not shown. Because of the difference in inertial characteristics of vapor components versus particulate components, it is far more difficult for the particulates components to change direction than the vapor components.

Length L shown in FIG. 6 is of such a length that the tendency for particulate flow from exit 25 to opening 41 into conduit 27 is substantially reduced. It has been found that the minimum length of L from entrained particle exit 25 to vapor take-off exit 41 shown in FIG. 6 is preferably at least about two (2) riser diameters, D, shown in FIG. 6 and still more preferably greater than two (2) riser diameters. Some benefits were found at low riser velocities, e.g. below thirty (30) feet per second of an L/D ratio of 17 as compared to 9. (See graph of FIG. 12.)

Figure 15:
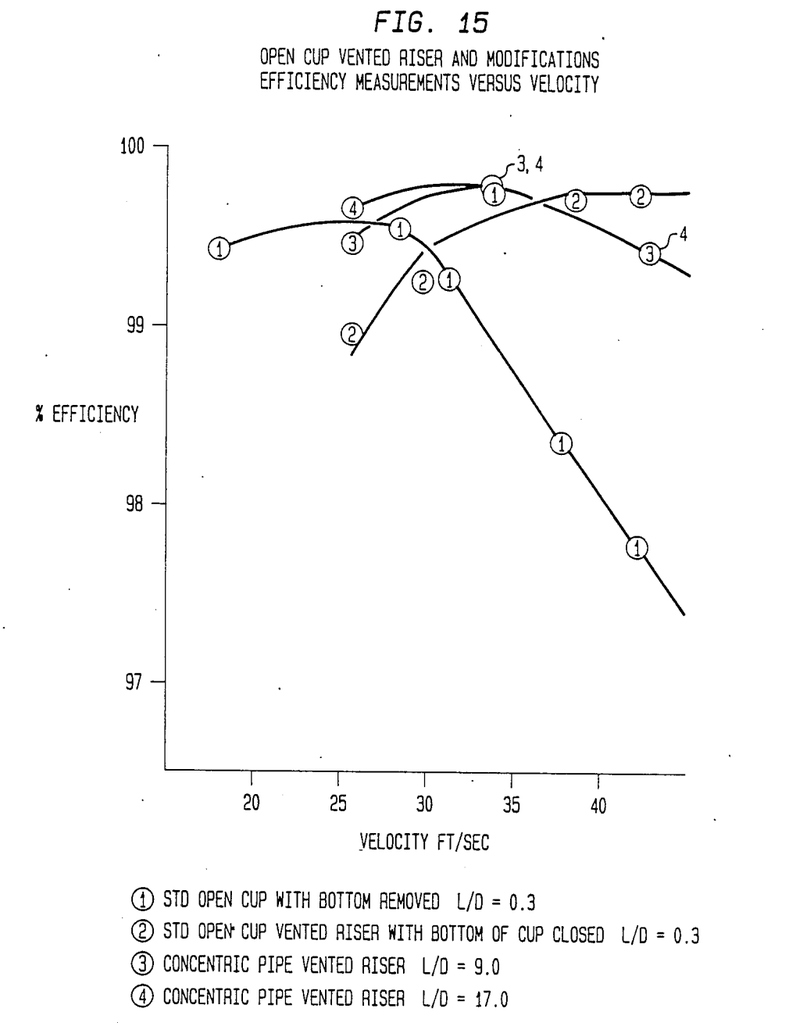
FIG. 15 contains graphs showing the relative separation performance as measured by percent efficiently at constant L/D as a function of velocity in feet/second of entrained particles in a vapor.

Also at lower velocities, e.g. below about 30 feet/second, there is little difference in efficiency between a standard open cup such as shown in FIG. 3, having a L/D equal to 0.3 and the same standard cup, but with bottom removed or open shown in FIG. 6, i.e. about 98.5% versus about 99.0%. This is shown in FIG. 15 with the curve for dots of circled 2's versus that curve for circled 1's. A cup with L/D equal to 0.3 at low velocity with a bottom (standard cup of FIG. 3) is more efficient than with its bottom removed or open (cup of FIG. 6). However, at increasing velocities, e.g. above about 30 feet/second, a totally unexpected phenomena occurs; efficiency of the standard cup (FIG. 6 with bottom open) drops off dramatically whereas that percent efficiency of a standard cup with bottom closed (shown in FIG. 3) does not drop off but increases to about 99.8% at 40 feet/second and above.

With L/D ratios of about 9 or greater, and the bottom of the cup removed, there is an improvement at lower speeds, e.g. less than 30 feet/second, and surprisingly no fall off in efficiency at speeds above 30 feet/second (see curves for circled 3's and 4's of FIG. 15).

In commercial operations involving vented risers, streams comprising vapors and particulates usually move at a velocity greater than 40 feet/second through the riser, except for a brief but important period of time during start-up.

There has not been found any limit as to the ultimate length. However, lengths in excess of two riser diameters do not seem to improve operating efficiencies significantly at velocities above thirty (30) feet per second. The importance of length L, defined as the approximate distance between the opening of exit 25 and the beginning of vapor take-off opening 41, is that any tendency of any particulates in a mixture of vapors and particulates to enter through exit 25 and leave through conduit 27 can be reduced substantially. Further benefits from having L with the length provided in this specification may involve a reduced tendency to build up coke or other carbonaceous deposits in the annular area between the vented riser and concentric pipe in situations where there is a high content of precursors, which can form coke or other carbonaceous deposits readily.

Figure 8:
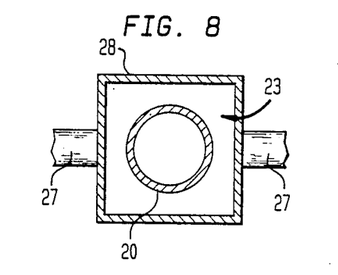
FIG. 8 is a top planar view in cross section along line 8—8 of an alternative embodiment of FIG. 6.

FIG. 8 is the top planar view along line 8—8 of FIG. 6 which discloses an alternate embodiment of the instant invention wherein conduit wall 28 is square as opposed to cylindrical. It has been found that in certain circumstances at certain velocities that a square wall 28 performs better than a cylindrical wall. However, in general, either a cylindrical or rectangular e.g., square, conduit wall 28 may be used. FIG. 8 uses the same numbering system for the same corresponding parts shown in FIG. 6.

Figure 14:
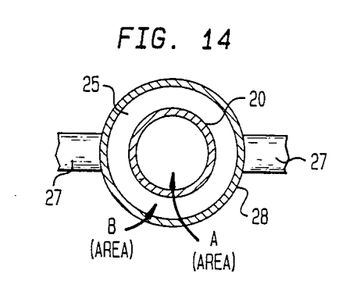
FIG. 14 discloses a planar view in cross section along line 14—14 of FIG. 6.

The purpose of FIG. 14 is to define two areas, area A and area B. For optimum operation of risers in keeping with the instant invention, it has been discovered that the ratio of area B to area A is preferably in the range of about 0.5 to about 1.25, and more preferably about 0.75 to about 1. This ratio of areas seems to apply to areas which arise from concentric circular conduits as well as rectangle or square conduits surrounding a circular conduit.

Figure 7:
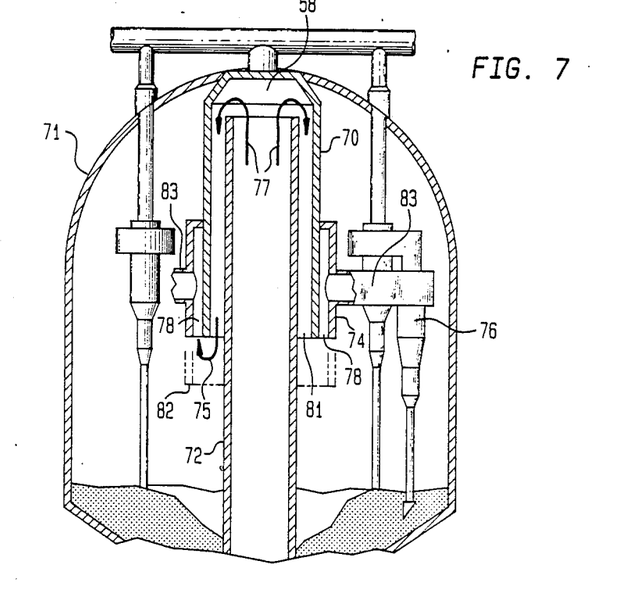
FIG. 7 shows an example of the instant invention as applied to the prior art shown in FIG. 4.

FIG. 7 discloses how an embodiment of the instant invention can apply to the prior art embodiment disclosed in FIG. 4. In FIG. 7, there is disclosed a riser 72, a reversing zone vessel 70 contained within a disengaging chamber 71, conduit wall 74 and conduit 83 to cyclone 76. Briefly, in operation a mixture of vapor and particulates rises through conduit 72 and exits axially into zone 58 defined by reversing chamber 70. The entire mixture of vapors and particulates undergoes a flow reversal as indicated by arrows 77. The mixture of particulates and vapors having undergone a flow reversal of 180° and exits through opening 81 defined by the interior wall of flow reversing chamber 70 and the outer surface of conduit 72. Since vapor components of the mixture of particulates and vapors exiting through opening 81 have a much lower inertia than particulate components, they can be more readily induced to flow along the path indicated by arrow 75 into entrance 78 and then through conduit 83 to a cyclone 76. The drop in pressure created by cyclone 76 within conduit 83 induces the flow path indicated by arrow 75. Vapor components are required to undergo a change in direction of 180° before they are able to enter entrance 78 leading to conduit 83 and cyclone 76. It is important to note that in this embodiment the mixture of vapors and particulates which leaves through axial opening 81 is in no way impeded by the conduit wall 74. The mixture of particulates and vapors enters directly into the disengaging chamber defined by wall 74. In other words there is no component of the conduit wall 74 such as phantom wall 82 which significantly extends beyond the opening 81. This, however, does not preclude or is not intended to preclude from consideration from within the scope of this invention of a small extension of conduit 74 as indicated in phantom outline by phantom extension wall 82. However, as phantom wall 82 either extends more and more beyond opening 81, or more and more below the opening, then entrainment of solids begins to occur more and more. Increased entrainment results in low separation efficiency.

Figure 9:
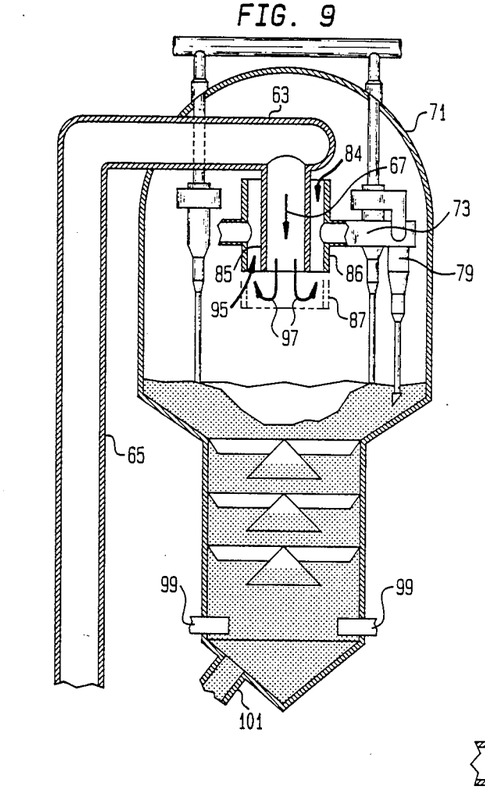
FIG. 9 shows an example of the instant invention as applied to the prior art embodiment shown in FIG. 5.

FIG. 9 discloses how an embodiment of the instant invention applies to the prior art exemplified in FIG. 5. Wherever possible, elements which are the same in both FIGS. 5 and 9 have been given the same numbers.

Unlike the embodiment of the prior art disclosed in FIG. 5, there is a wall conduit 86 which surrounds at least part of the downwardly directed conduit 85 of FIG. 5. Also, instead of conduit 73 in fluid communication with conduit 85, conduit 73 is in fluid communication with conduit 86. Conduit 86 defines an annular space between the exterior surfaces of conduit 85 and the interior surfaces of conduit 86. There are two openings to the annular space immediately surrounding conduit 85 which are openings 84 and 95. The mixture of vapors and particulates from riser 65 are caused to change direction by conduits 63 and 85 so as to flow in the direction shown by arrow 67. Because of the difference in inertia between particulates and vapor components, the vapor components are induced more easily to flow in a direction indicated by arrows 97. The particulates tend to continue in a downwardly directed path of flow within disengaging chamber or vessel 71. Of critical importance to the embodiment disclosed in FIGURE 9 is the presence of an additional opening 84. This opening permits an alternate flow path for stripper gas introduced by stripper gas conduits 99. As is common practice in the art, carbonaceous coked catalyst are generally steam stripped prior to return to a regenerator (not shown) through conduit 101. Stripper gas entering through conduits 99 creates a flow pattern within disengaging chamber 71 that, but for the change in structure provided by conduit 86, would result in additional entrained particles entering cyclones 79 through conduits 73. Of still more importance is the fact that conduit 86 can extend a short distance beyond the downstream opening of conduit 85. This is indicated by the phantom wall extension 87. Preferably, wall 86 does not extend beyond the opening of conduit 85 nor is well 86 much shorter than conduit 85, for the same reasons concerning particulate reentrainment discussed with respect to FIG. 7.

Figure 10:
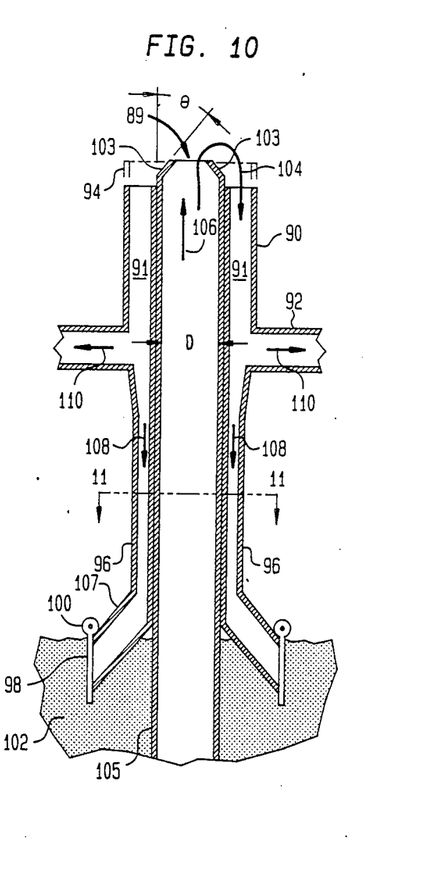
FIG. 10 shows an alternate embodiment of the instant invention involving diplegs.

In FIG. 10, there is a riser 105, conduit wall 90, a conduit 92 to a cyclone not shown, diplegs 96 with a valve 98. The valve 98 is pivotally attached at pivot point 100 so as to permit only unidirectional flow from within diplegs 96 to dense phase bed 102. Briefly, operation of the embodiment disclosed in FIG. 10 is as follows. Vapors and particulates rising through riser 105 exit axially into a disengaging chamber (not shown) in FIG. 10. Flow path of the material exiting from riser 105 is indicated by arrows 104 and 106. Arrow 104 indicates the flow path of vapor components induced to flow in a path transverse to the axial path indicated by arrow 106. Arrow 106 represents the flow path followed by particulate components substantially free of vapor components. The difference in the inertial character of the vapor components versus the particulate components permits the pressure drop caused by the cyclones (not shown) within conduit 92 to cause vapor components indicated by arrow 104 to move into conduit chamber 91 defined by conduit wall 90 and riser 105, and then out though conduit 92 in the direction indicated by arrow 110. Since there are some particulates that remain entrained within the vapor components indicated by arrow 104, these are permitted to flow in the direction of arrow 108 into dipleg 96 then into foot portion 107 and then through valve 98 into dense bed 102. It is important to note that the chamber defined by conduit 90 and riser 105 from which vapors are withdrawn through conduit 92 does not significantly or to any substantial degree impede or interact directly with the axial flow of components from riser 105. Although it is within the intent of this invention to permit some of conduit 90 to some degree to extend, as indicated by phantom lines 94, above at least a small portion of the axial opening 89, if phantom wall 94 extends too far past the axial opening 89 of riser 105 then some additional components of entrained particulates will be induced to flow into chamber 91 defined by the exterior surface of riser 105 and the interior surfaces of wall 90. Accordingly, there is a point of diminishing returns as to the advantage of having phantom wall 94 extend any substantial degree above axial opening 89. Alternatively, if the opening into conduit chamber 92 is much below axial opening of conduit 105, then some additional components of entrained particles will begin to occur with greater and greater frequency as the opening to conduit chamber 91 is increasingly below axial opening 89.

Optionally, there may be added a beveled lip 103 to riser 105. Bevelled lip or protection 103 impacting the velocity of the flow of vapor and particulates leads in certain situations to a somewhat better separation of particulates from vapors. The length of protection 103 is approximately of about ⅛ the distance of the inside diameter, D, of the riser 105 and is preferably at an angle of about 5 to about 30 degrees, preferably about 10 to about 20 degrees from the axial-direction defined by the conduit walls of riser 105. The relevant angle is shown as the Greek Symbol, Theta, in FIG. 10.

Figure 11:
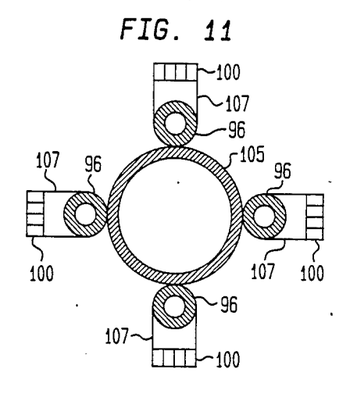
FIG. 11 is a top planar view in cross section along line 11—11 of FIG. 10 disclosing an alternate embodiment which involves diplegs.

FIG. 11 discloses a top planar view along line 11—11 of FIG. 10. Elements of each FIGURE are numbered consistently. In the embodiment of FIG. 11, conduit 90 is not shown. Conduit 90 can be in other shapes other than a cylinder such as for example a square or rectangle as discussed in FIG. 8.

Figure 12:
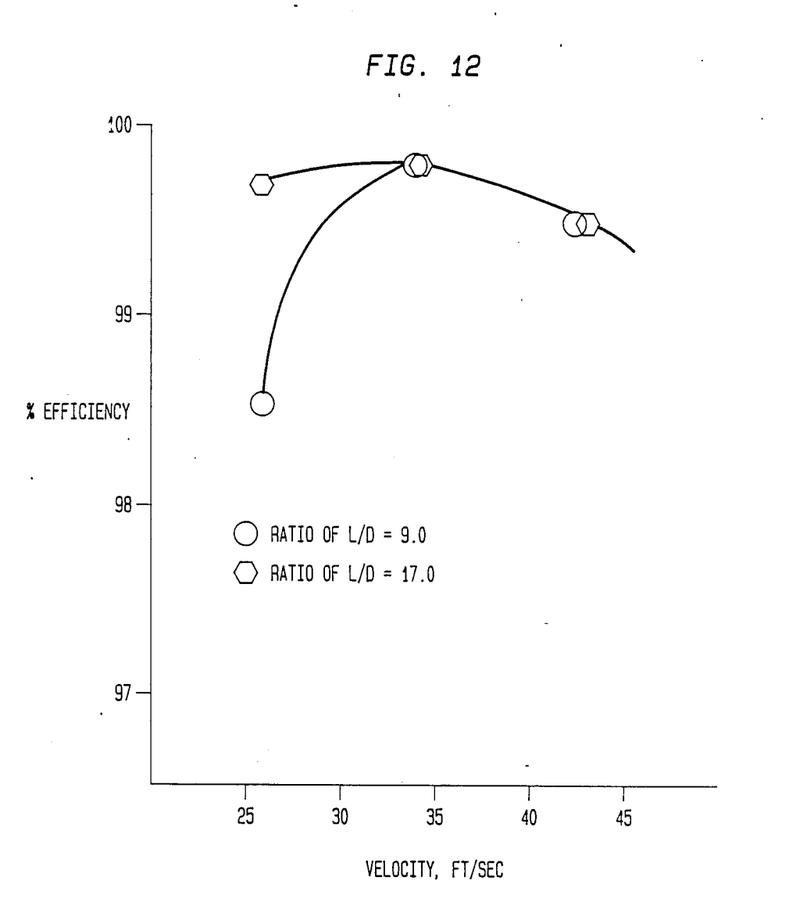
FIG. 12 discloses graphs showing results of using the instant invention in simulation studies.

FIG. 12, discloses graphs which are discussed in section entitled Examples.

In FIG. 13, the downstream portion of a riser 200 is within a disengaging zone (not shown) to which there is a downstream conduit 202 from which there is a conduit 204 in fluid communication with interior zone 205 of conduit 202. Conduit 204 is in fluid communication with a cyclone separator means (not shown). Operation of the prior art embodiment in FIG. 13 is as follows. A mixture of vapor and particulate components moving in the direction shown by arrow 203 is diverted inwardly by projection 206. The mixture then enters zone 205 within conduit 202. The vapor components of that mixture are caused by a differential pressure preferably because of much lower inertia for the vapor components as compared to the particulate components to be diverted transversely through conduit 204 to a cyclone (not shown).

Of importance to the operation of the prior art embodiment of FIG. 13 is that the entire mixture of vapor and particulate components must enter zone 205 prior to diversion transverse to the direction established by axial opening of conduit 200. There is a space 208 between conduit 202 and 200 to avoid problems that were indicated in the reference (U.S. Pat. No. 4,394,349) to otherwise arise from thermal expansion.

EXAMPLES

The concept of the invention was evaluated in a testing unit. The experimental apparatus used to test this concept is a clear plastic model of a cracking unit consisting of a riser, disengager/stripper, two stage regenerator and connecting standpipes. The model is operated at room temperature under vacuum. Room air enters the unit at the bottom of the riser and base of the regenerator through regulating valves and is discharged from the disengaging chamber and regenerator, respectively. All vaporous effluents are metered and exited through a vacuum pump. Room air can also enter the unit in other locations such as the stripper zone if necessary to simulate steam stripping in a commercial unit. The riser diameter of this unit is ½ inch with the other dimensions scaled appropriately.

A test is conducted by passing a specific amount of fluidized solid up the riser over a specific time and with a specific riser gas velocity. Solids lost from the disengaging chamber are recovered in an external cyclone with a sealed dipleg. Separation efficiency is determined as:

$$100\% \left(1 - \frac{\text{Loss}}{\text{Load}}\right) = \% \text{ Efficiency}$$

Where:
Loss = solids collected in the external cyclone dipleg.
Load = amount of catalyst passed up the riser.

Three vented cup risers were built out of Lucite acrylic sheet tubing. Vented cup riser A, B and C had a double pipe design. The ratio of L to inside diameter of riser, D, for risers A–C are, respectively, about 9.4, 9, and 17. See FIG. 6 and corresponding discussion for the definition for L and D.

Generally, the tests with stripper air were less efficient than the tests without. The stripper air could have decreased efficiency because more air was introduced into the reactor and created a larger RXR/cyclone DP.

The concentric or double pipe vented riser A is illustrated in FIG. 6. It is a modification of the vented riser exemplified in FIG. 3. Medium velocity achieved the best efficiency. (See FIG. 12.)

EFFICIENCY STUDIES DOUBLE PIPE VENTED CUP RISER A

| Time (sec) | Cat. Lost (g) | Flow Rate (lbs/sec) | Air Velocity (ft/sec) | Efficiency |
|---|---|---|---|---|
| 342 | 28.0 | .0574 | 43 | 99.68 |
| 232 | 15.9 | .0846 | 34 | 99.82 |
| 220 | 73.3 | .0897 | 25.8 | 98.50 |

Double pipe vented riser B as shown in FIG. 6 is similar to vented riser A shown in FIG. 3, except that the bottom has been removed to allow trapped catalyst to fall freely. (See FIG. 6.) Although medium velocity was still the most efficient, the overall efficiency decreased.

EFFICIENCY STUDIES DOUBLE PIPE VENTED CUP RISER B

| Time (sec) | Cat. Lost (g) | Flow Rate (lbs/sec) | Air Velocity (ft/sec) | Efficiency |
|---|---|---|---|---|
| 616 | 43.7 | .0320 | 43 | 99.51 |
| 264 | 17.0 | .0746 | 34 | 99.81 |
| 255 | 133.8 | .0770 | 25.8 | 98.50 |

Double pipe vented cup riser C has the longest cup. By increasing the length of the cup, the resistance of air flow up the cup increased and the efficiency increased. Also 50% of the bottom of the cup was closed.

EFFICIENCY STUDIES DOUBLE PIPE VENTED CUP RISER C

| Time (sec) | Cat. Lost (g) | Flow Rate (lbs/sec) | Air Velocity (ft/sec) | Efficiency |
|---|---|---|---|---|
| 499 | 43.8 | .0402 | 43 | 99.51 |
| 228 | 17.8 | .0836 | 34 | 99.80 |
| 226 | 25.7 | .0832 | 25.8 | 99.71 |

EXAMPLE SHOWING EFFICIENCIES AS A FUNCTION OF VELOCITY

FIG. 15 discloses graphs of the standard open cup vented riser in comparison to cups without any bottom (concentric pipe configuration) with L/D ratios from 0.3 to 17.0. Efficiency measurements were made on the standard open cup vented riser as shown with the circles containing the number 2. The efficiency increases with increasing velocity until about 33 feet/second and then the efficiency remains constant. The L/D ratio of the standard cup is 0.3. By removing the bottom of the cup as shown by the circles with the number 1, the efficiency, although higher at lower velocities, rapidly decreases with increasing velocity.

Since commercial operations use riser velocities in general greater than 40 feet/second and up to 100 feet/second the conclusion one would draw from the above experiments is that removing the bottom of the cup is not advantageous.

Additional experiments were made with the open cup with the bottom removed (called the concentric pipe vented riser) with L/D ratios of 9.0, 9.4 and 17.0. As shown on the graph by the circled 3's and 4's, these configurations gave high efficiencies at all velocity ranges checked. In unit start-up situations, riser velocities are usually initially low. The concentric pipe separators would provide high efficiency separations in this region as well as the higher velocity operating ranges.

EXAMPLE SHOWING EFFICIENCY AT CONSTANT VELOCITY AS A FUNCTION OF L/D

Figure 16:
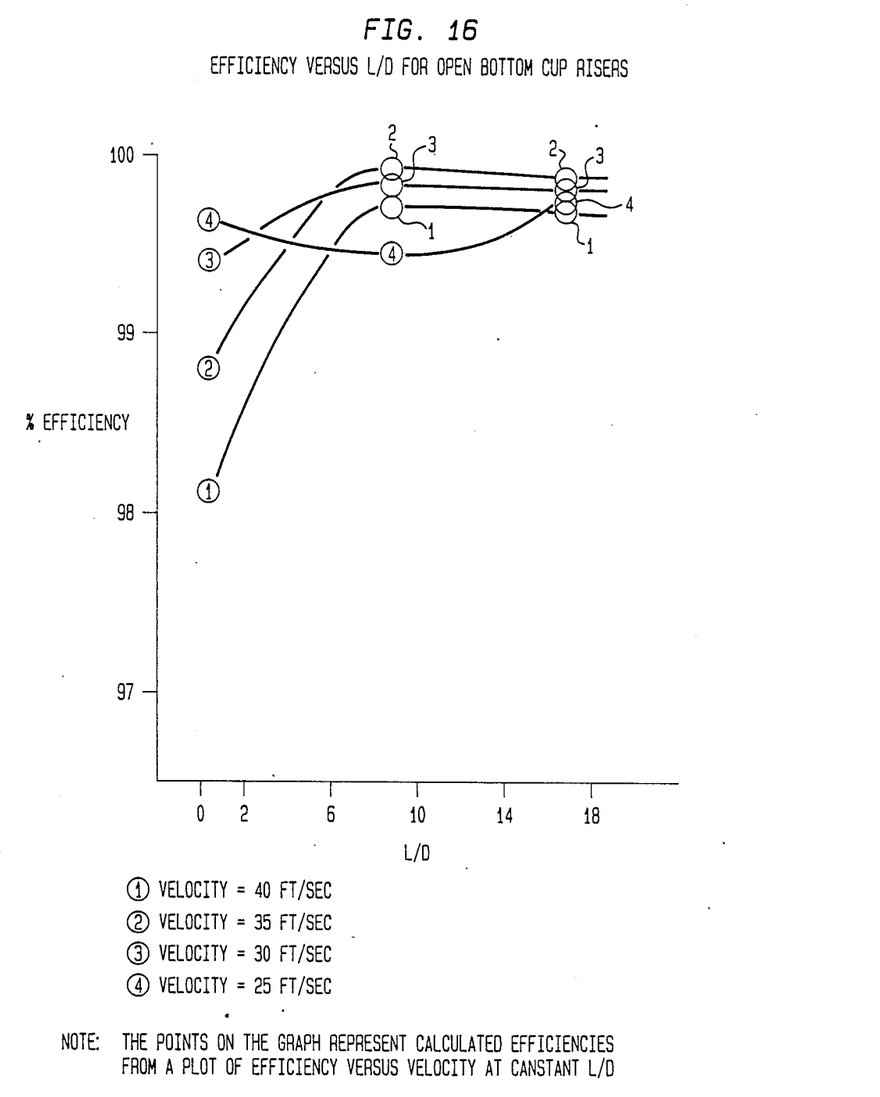
FIG. 16 contains graphs of efficiency at constant velocity in feet/second as a function of L/D. Length L is shown and defined in FIG. 6. D is the inside diameter of the riser.

FIG. 16 shows the effect of varying the L/D ratio at different velocities. At the lower velocities, below 30 feet/second, the efficiencies do not appreciably change with changing L/D for the open cup/open bottom vented riser. The advantage of increasing L/D becomes apparent, however, at velocities above about 30 feet/second.

That efficiency is not significantly changed for velocities of from 25 to 30 feet/second with a changing L/D ratio of from 0.3 to 17 is demonstrated by the relatively flat or horizontal nature of curves for circled 3's and 4's corresponding respectively to velocities 30 and 25.

However, for velocities of 30 and 35, curves for circled 2's and 3's respectively, there is a dramatic improvement in efficiency as a function of L/D from about a ratio of 2 and above. The benefits reaching a maximum for a L/D about 6 and above.

The data used in plotting graphs shown in FIG. 15 is given in the following Table for FIG. 15.

TABLE FOR FIG. 15

Conventional Open Cup Vented Riser Efficiency Measurements with no stripper air and no simulated cyclones.
L/D = .3

| Time, sec | Velocity ft/sec | Efficiency % | Time, sec | Velocity ft/sec | Efficiency % |
|---|---|---|---|---|---|
| 272 | 25.6 | 98.58 | 228 | 29.9 | 99.31 |
| 251 | 25.6 | 98.69 | 207 | 29.9 | 99.28 |
| 299 | 25.6 | 99.60 | 217 | 29.9 | 99.25 |
| 291 | 25.6 | 99.49 | | | |
| 286 | 25.6 | 98.84 | | | |
| average | | 99.04 | average | | 99.28 |
| 322 | 34.1 | 99.71 | 429 | 38.4 | 99.79 |
| 306 | 34.1 | 99.81 | 407 | 38.4 | 99.63 |
| 310 | 34.1 | 99.89 | 343 | 38.4 | 99.87 |
| 296 | 34.1 | 99.82 | 406 | 38.4 | 99.81 |
| | | | 381 | 38.4 | 99.77 |
| average | | 99.81 | average | | 99.77 |

Opencup vented riser test with bottom of cup open
L/D - .3

| | | | 320 | 17.9 | 99.43 |
|---|---|---|---|---|---|
| 471 | 42.7 | 99.83 | 405 | 28.5 | 99.59 |
| 569 | 42.7 | 99.85 | 341 | 28.5 | 99.69 |
| 468 | 42.7 | 99.76 | 466 | 31.5 | 99.22 |
| 511 | 42.7 | 99.87 | 302 | 31.5 | 99.40 |
| average | | 99.83 | 1191 | 38.0 | 98.38 |
| | | | 1455 | 42.5 | 97.79 |

The above data shows the steep decline in efficiency as the velocity is increased Specific compositions, methods, or embodiments discussed are intended to be only illustrative of the invention disclosed by this Specification. Variation on these compositions, methods, or embodiments, such as combinations of features from various embodiments, are readily apparent to a person of skill in the art based upon the teachings of this Specification and are therefore intended to be included as part of the inventions disclosed herein.

Any reference to patents made in the Specification is intended to result in such patents being expressly incorporated herein by reference including any patents or other literature references cited within such patents.

The invention which is claimed is:

1. An apparatus including means for separating particulates from a mixture of particulates and vapors comprising:
    (A) a disengaging chamber serving as a reservoir for the collection of solid particulates;
    (B) longitudinal transport means for transporting the mixture, which has a downstream end having an axial opening which is totally within said disengaging chamber;
    (C) means defining a conduit chamber surrounding at least a portion of said downstream end which does not directly impinge particulates that travel in a path determined by said axial opening of said transport means, wherein said chamber:
        a. comprises a wall-surface which does not restrict said axial opening of said transport means and wherein said chamber is defined between the extension surface of said transport means and interior surface of said wall-surface.
        b. has means defining a fluid opening at substantially opposite ends so as to define an entrance and an exit; and
        c. includes means defining a vapor-take-off-exit at a location intermediate to said entrance and said exit, which is adapted for fluid communication with a second means for separating said particulates from vapors, wherein the ratio of length, from the exit of said conduit chamber to the vapor-take-off-exit of said conduit chamber, to inside diameter of the transport means is at least 2.

2. The separation means of claim 1, wherein said wall-surface defines a cross-sectional area at right angles to said axial opening which is a square or rectangle in shape.

3. The separation means of claim 1, wherein the ratio of the cross sectional area of the conduit chamber to the cross sectional area of the transport means is in the range of about 0.5 to about 1.25.

4. The separation means of claim 1, wherein the ratio of length, from the exit of said conduit chamber to the vapor take-off exit of said conduit chamber to the inside diameter of the transport means is at least 15.

5. The separation means of claim 1, wherein the ratio of length, from the exit of said conduit chamber to the vapor take-off exit of said conduit chamber, to the inside diameter of the transport means is at least 15.

6. The separation means of claim 1, wherein said chamber completely surrounds said downstream end of said transport means.

7. The separation means of claim 6, wherein said exit is in fluid communication with a dipleg.

8. The separation means of claim 6, wherein the ratio of the cross sectional area of the conduit chamber to the cross sectional area of the transport means is in the range of about 0.5 to about 1.25.

9. The separation means of claim 1, wherein an edge of said wall-surface nearest said entrance of said chamber does not project beyond said axial opening of said transport means.

10. The separation means of claim 9, wherein the ratio of the cross sectional area of the conduit chamber to the cross sectional area of the transport means is in the range of about 0.5 to about 1.25.

11. The separation means of claim 9, wherein the ratio of length, from the exit of said conduit chamber to the vapor take-off exit of said conduit chamber, to inside diameter of the transport means is at least 15.

12. The separation means of claim 1, wherein an edge of said wall-surface nearest said entrance of said chamber is above said unrestricted axial opening of said transport means.

13. The separation means of claim 12, wherein the ratio of the cross sectional area of the conduit chamber to the cross sectional area of the transport means is in the range of about 0.5 to about 1.25.

14. The separation means of claim 1, wherein at least a portion of said wall-surface is planar.

15. The separation means of claim 14, wherein said wall-surface completely surrounds said downstream end of said transport means.

16. The separation means of claim 14, wherein said wall-surface defines a cross-sectional area at right angles to said axial opening which is a square or rectangle in shape.

17. The separation means of claim 14, wherein said exit is in fluid communication with a dipleg.

18. The separation means of claim 1, wherein said exit of said chamber is in fluid communication with a dipleg.

19. The separation means of claim 18, wherein the ratio of the cross sectional area of said conduit chamber to the cross sectional area of said transport means is in the range of about 0.5 to about 1.25.

20. The separation means of claim 1, further including a projection means extending inwardly into said axial opening of said transport means.

21. The separation means of claim 20, wherein the ratio of length, from the exit of said conduit chamber to the vapor take-off exit of said conduit chamber to the inside diameter of the transport means is at least 15.

22. The separation means of claim 20, wherein the length of said projection is at least equal to ½ inside diameters of said transport means and wherein said projection is at an angle with respect to the longitudinal axis of said transport means in the range of about 5 to 30 degrees.

23. The separation means of claim 22, wherein said angle is in the range of about 10 to about 20 degrees.

* * * * *